(12) United States Patent
Kekan

(10) Patent No.: US 11,548,661 B2
(45) Date of Patent: Jan. 10, 2023

(54) SYSTEMS AND METHOD FOR AUTOMATED SERVICING OF SHOCK STRUTS

(71) Applicant: GOODRICH CORPORATION, Charlotte, NC (US)

(72) Inventor: Rajendra S. Kekan, Taluka- Karmala (IN)

(73) Assignee: Goodrich Corporation, Charlotte, NC (US)

(*) Notice: Subject to any disclaimer, the term of this patent is extended or adjusted under 35 U.S.C. 154(b) by 205 days.

(21) Appl. No.: 16/984,482

(22) Filed: Aug. 4, 2020

(65) Prior Publication Data
US 2021/0309389 A1    Oct. 7, 2021

(30) Foreign Application Priority Data

Apr. 3, 2020    (IN) .............................. 202041014917

(51) Int. Cl.
*B64F 5/40*    (2017.01)
*G05D 7/06*    (2006.01)
(Continued)

(52) U.S. Cl.
CPC ................ *B64F 5/40* (2017.01); *B64C 25/58* (2013.01); *B64C 25/60* (2013.01); *B64F 5/60* (2017.01);
(Continued)

(58) Field of Classification Search
CPC ... B64F 5/40; B64F 5/60; B64C 25/58; B64C 25/60; F16F 9/06; F16F 9/3271; G05D 7/0623; G05D 7/0635; G05D 7/0676
See application file for complete search history.

(56) References Cited

U.S. PATENT DOCUMENTS 3,889,904 A * 6/1975 Jones ........................ B64F 5/60
141/49
5,944,283 A * 8/1999 Carter, Jr. ............... B64C 25/00
188/289
(Continued)

FOREIGN PATENT DOCUMENTS

CN    103597239    5/2016
EP    3118111    1/2017
(Continued)

OTHER PUBLICATIONS

European Patent Office, European Search Report dated Aug. 17, 2021 in Application No. 21165712.7.

*Primary Examiner* — William M McCalister
(74) *Attorney, Agent, or Firm* — Snell & Wilmer L.L.P.

(57) ABSTRACT

A system for servicing a shock strut may comprise a system controller and a tangible, non-transitory memory configured to communicate with the system controller. The tangible, non-transitory memory may have instructions stored thereon that, in response to execution by the system controller, cause the system controller to perform operations, which may comprise: receiving, by the system controller, a hydraulic fluid volume difference or a pressurized gas volume difference from a ground support controller; determining, by the system controller, a desired fluid flow rate based on the hydraulic fluid volume difference or the pressurized gas volume difference; and outputting, by the system controller, a desired fluid flow rate signal corresponding to the desired fluid flow rate to at least one of a hydraulic fluid flow controller or a pressurized gas flow controller.

14 Claims, 4 Drawing Sheets

(51) Int. Cl.
*B64C 25/58* (2006.01)
*B64F 5/60* (2017.01)
*F16F 9/32* (2006.01)
*F16F 9/06* (2006.01)
*B64C 25/60* (2006.01)

(52) U.S. Cl.
CPC .............. *F16F 9/06* (2013.01); *F16F 9/3271* (2013.01); *G05D 7/0623* (2013.01); *G05D 7/0635* (2013.01); *G05D 7/0676* (2013.01)

(56) References Cited

U.S. PATENT DOCUMENTS

| | | | |
|---|---|---|---|
| 6,120,009 A * | 9/2000 | Gatehouse | B64C 25/60 267/64.11 |
| 6,293,141 B1 * | 9/2001 | Nance | G01G 19/07 73/178 T |
| 8,565,968 B2 | 10/2013 | Nance | |
| 9,285,007 B2 | 3/2016 | Fazeli | |
| 9,856,038 B2 | 1/2018 | Fazeli et al. | |
| 10,266,256 B2 * | 4/2019 | Fazeli | F16F 9/062 |
| 10,269,188 B2 * | 4/2019 | Fazeli | B64C 25/60 |
| 10,358,236 B2 | 7/2019 | Pountney et al. | |
| 10,823,250 B2 * | 11/2020 | Fazeli | B64F 5/60 |
| 2008/0033607 A1 * | 2/2008 | Zeliff | B64D 45/0005 701/31.4 |
| 2014/0046533 A1 * | 2/2014 | Nance | B64F 5/60 701/33.7 |
| 2015/0276001 A1 * | 10/2015 | Keil | F16F 9/3271 188/313 |
| 2016/0101877 A1 * | 4/2016 | Shepherd | B64C 25/60 29/402.18 |
| 2017/0008647 A1 * | 1/2017 | Pountney | B64D 45/0005 |
| 2017/0008648 A1 * | 1/2017 | Pountney | F16F 9/3271 |

FOREIGN PATENT DOCUMENTS

| | | |
|---|---|---|
| EP | 3165469 | 5/2017 |
| EP | 3184423 | 6/2017 |
| EP | 3184423 | 11/2017 |
| EP | 3424815 | 1/2019 |
| EP | 3578847 | 12/2019 |
| WO | 2013160691 | 10/2013 |
| WO | 2014184521 | 11/2014 |

* cited by examiner

SYSTEMS AND METHOD FOR AUTOMATED SERVICING OF SHOCK STRUTS

CROSS REFERENCE TO RELATED APPLICATIONS

This application claims priority to and the benefit of India Patent Application No. 202041014917 filed on Apr. 3, 2020 and entitled "SYSTEMS AND METHOD FOR AUTOMATED SERVICING OF SHOCK STRUTS," which is hereby incorporated by reference in its entirety for all purposes.

FIELD

The present disclosure relates generally to the field of landing gear, and more specifically to systems and methods for automated servicing of shock struts.

BACKGROUND

Shock absorbing devices are used in a wide variety of vehicle suspension systems for controlling motion of a vehicle and its tires with respect to the ground and for reducing transmission of transient forces from the ground to the vehicle. Shock absorbing struts are a common component in most aircraft landing gear assemblies. Current shock struts generally rely on pressurized gas (e.g., nitrogen gas) and hydraulic fluid (e.g., oil) to absorb various shock load. Having a correct quantity of each of these fluids in the shock strut is needed for proper performance. During landing gear maintenance, gas and/or hydraulic fluid may be added to the shock strut. Current fluid servicing systems are operated manually, for example, by maintenance personnel controlling the pumps used to input the fluid into the shock strut. Manually controlling the pumps is time consuming, may require skilled maintenance personnel, can lead to overflow and/or wasted fluid, and is generally a less accurate way of controlling the amount of fluid added.

SUMMARY

A system for servicing a shock strut is disclosed herein. In accordance with various embodiments, the system may comprise a system controller and a first tangible, non-transitory memory configured to communicate with the system controller. The first tangible, non-transitory memory may have instructions stored thereon that, in response to execution by the system controller, cause the system controller to perform operations, which may comprise: receiving, by the system controller, at least one of a hydraulic fluid volume difference or a pressurized gas volume difference from a ground support controller; determining, by the system controller, a desired fluid flow rate based on the at least one of the hydraulic fluid volume difference or the pressurized gas volume difference; and outputting, by the system controller, a desired fluid flow rate signal corresponding to the desired fluid flow rate to at least one of a hydraulic fluid flow controller or a pressurized gas flow controller.

In various embodiments, the system may comprise the hydraulic fluid flow controller and a second tangible, non-transitory memory configured to communicate with the hydraulic fluid flow controller. The second tangible, non-transitory memory may have instructions stored thereon that, in response to execution by the hydraulic fluid flow controller, cause the hydraulic fluid flow controller to perform operations, which may comprise: receiving, by the hydraulic fluid flow controller, the desired fluid flow rate signal; and outputting, by the hydraulic fluid flow controller, a command to a pump. The command may be configured to cause the pump to pump a flow of hydraulic fluid at a fluid flow rate equal to the desired fluid flow rate.

In various embodiments, the system may comprise the hydraulic fluid flow controller and a second tangible, non-transitory memory configured to communicate with the hydraulic fluid flow controller. The second tangible, non-transitory memory may have instructions stored thereon that, in response to execution by the hydraulic fluid flow controller, cause the hydraulic fluid flow controller to perform operations, which may comprise: receiving, by the hydraulic fluid flow controller, the desired fluid flow rate signal; and outputting, by the hydraulic fluid flow controller, a command to a valve. The command may be configured to cause the valve to actuate to a position configured to output a flow of hydraulic fluid at a fluid flow rate equal to the desired fluid flow rate.

In various embodiments, the system may comprise the pressurized gas flow controller and a second tangible, non-transitory memory configured to communicate with the pressurized gas flow controller. The second tangible, non-transitory memory may have instructions stored thereon that, in response to execution by the pressurized gas flow controller, cause the hydraulic fluid flow controller to perform operations, which may comprise: receiving, by the pressurized gas flow controller, the desired fluid flow rate signal; and outputting, by the pressurized gas flow controller, a command to a pump. The command may be configured to cause the pump to pump a flow of pressurized gas at a fluid flow rate equal to the desired fluid flow rate.

In various embodiments, the system may comprise the pressurized gas flow controller and a second tangible, non-transitory memory configured to communicate with the pressurized gas flow controller. The second tangible, non-transitory memory may have instructions stored thereon that, in response to execution by the pressurized gas flow controller, cause the hydraulic fluid flow controller to perform operations, which may comprise: receiving, by the pressurized gas flow controller, the desired fluid flow rate signal; and outputting, by the pressurized gas flow controller, a command to a valve. The valve may be configured to control a flow of pressurized gas. The command may be configured to cause the valve to actuate to a position configured to output the flow of pressurized gas at a fluid flow rate equal to the desired fluid flow rate.

In various embodiments, determining, by the system controller, the desired fluid flow rate based on the at least one of the hydraulic fluid volume difference or the pressurized gas volume difference may comprise: determining, by the system controller, if the at least one of the hydraulic fluid volume difference or the pressurized gas volume difference is greater than or equal to a first threshold value.

In various embodiments, determining, by the system controller, the desired fluid flow rate based on the at least one of the hydraulic fluid volume difference or the pressurized gas volume difference may further comprise: determining, by the system controller, if the at least one of the hydraulic fluid volume difference or the pressurized gas volume difference is greater than or equal to a second threshold value; and determining, by the system controller, to output at least one of a first fluid flow rate, a second fluid flow rate, or a third fluid flow rate as the desired fluid flow rate signal. The system controller may output the first fluid flow rate as the desired fluid flow rate signal if the at least one of the hydraulic fluid volume difference or the pressurized gas volume difference is greater than or equal to the first threshold value. The system controller may output the second fluid flow rate as the desired flow rate signal if the at least one of the hydraulic fluid volume difference or the pressurized gas volume difference is greater than or equal to the second threshold value and less than the first threshold value. The system controller may output the third fluid flow rate as the desired fluid flow rate signal if the at least one of the hydraulic fluid volume difference or the pressurized gas volume difference is less than the second threshold value.

A method for servicing a shock strut is also disclosed herein. In accordance with various embodiments, the method may comprise the steps of receiving, by a system controller, at least one of a hydraulic fluid volume difference or a pressurized gas volume difference from a ground support controller; determining, by the system controller, a desired fluid flow rate based on the at least one of the hydraulic fluid volume difference or the pressurized gas volume difference; and outputting, by the system controller, a desired fluid flow rate signal corresponding to the desired fluid flow rate to at least one of a hydraulic fluid flow controller or a pressurized gas flow controller.

In various embodiments, the method may further comprise the steps of receiving, by the at least one of the hydraulic fluid flow controller or the pressurized gas flow controller, the desired fluid flow rate signal; and outputting, by the at least one of the hydraulic fluid flow controller or the pressurized gas flow controller, a command to a pump. The pump may be configured to control a flow of at least one of a pressurized gas or a hydraulic fluid. The command may be configured to cause the pump to pump the flow of the at least one of the pressurized gas or a hydraulic fluid at a fluid flow rate equal to the desired fluid flow rate.

In various embodiments, the method may further comprise the steps of receiving, by the at least one of the hydraulic fluid flow controller or the pressurized gas flow controller, the desired fluid flow rate signal; and outputting, by the at least one of the hydraulic fluid flow controller or the pressurized gas flow controller, a command to a valve. The valve may be configured to control a flow of at least one of a pressurized gas or a hydraulic fluid. The command may be configured to cause the valve to actuate to a position configured to output the flow of the at least one of the pressurized gas or the hydraulic fluid at a fluid flow rate equal to the desired fluid flow rate.

In various embodiments, the method may further comprise the steps of determining, by the ground support controller, at least one of a desired hydraulic fluid volume or a desired pressurized gas volume; determining, by the ground support controller, at least one of an actual hydraulic fluid volume or an actual pressurized gas volume; and determining, by the ground support controller, the at least one of the hydraulic fluid volume difference or the pressurized gas volume difference by comparing the at least one of the desired hydraulic fluid volume or the desired pressurized gas volume to the least one of the actual hydraulic fluid volume or the actual pressurized gas volume.

In various embodiments, the step of determining, by the system controller, the desired fluid flow rate based on the at least one of the hydraulic fluid volume difference or the pressurized gas volume difference may further comprise the step of determining, by the system controller, if the at least one of the hydraulic fluid volume difference or the pressurized gas volume difference is greater than or equal to a first threshold value.

In various embodiments, the step of determining, by the system controller, the desired fluid flow rate based on the at least one of the hydraulic fluid volume difference or the pressurized gas volume difference may further comprise the steps of determining, by the system controller, if the at least one of the hydraulic fluid volume difference or the pressurized gas volume difference is greater than or equal to a second threshold value; and determining, by the system controller, to output at least one of a first fluid flow rate, a second fluid flow rate, or a third fluid flow rate as the desired fluid flow rate signal. The system controller may output the first fluid flow rate as the desired fluid flow rate signal if the at least one of the hydraulic fluid volume difference or the pressurized gas volume difference is greater than or equal to the first threshold value. The system controller may output the second fluid flow rate as the desired fluid flow rate signal if the at least one of the hydraulic fluid volume difference or the pressurized gas volume difference is greater than or equal to the second threshold value and less than the first threshold value. The system controller may output the third fluid flow rate as the desired fluid flow rate signal if the at least one of the hydraulic fluid volume difference or the pressurized gas volume difference is less than the second threshold value.

In various embodiments, the method may further comprise the step of outputting, by the at least one of the hydraulic fluid flow controller or the pressurized gas flow controller, a command to at least one of a valve or a pump, in response to receiving the desired fluid flow rate signal. The command may be configured to cause a flow of at least one of a hydraulic fluid or a pressurized gas output from the at least one the valve or the pump to flow at a fluid flow rate equal to the at least one of the first fluid flow rate, the second fluid flow rate, or the third fluid flow rate.

A system for servicing a shock strut, in accordance with various embodiments, may comprise a hydraulic fluid source, a first valve configured to regulate a flow of hydraulic fluid from the hydraulic fluid source to the shock strut, and a hydraulic fluid flow controller configured to control actuation of the first valve. The system may further comprise a pressurized gas source, a second valve configured to regulate a flow of pressurized gas from the pressurized gas source to the shock strut, a pressurized gas flow controller configured to control actuation of the second valve, and a system controller electrically coupled to the hydraulic fluid flow controller and the pressurized gas flow controller. The system controller may be configured to output desired fluid flow rate signals to the hydraulic fluid flow controller and the pressurized gas flow controller.

In various embodiments, the system controller may be configured to determine the desired fluid flow rate based on at least one of a hydraulic fluid volume difference or a pressurized gas volume difference.

In various embodiments, the first valve may output hydraulic fluid at a first fluid flow rate if the hydraulic fluid volume difference is greater than or equal to a first threshold value and at a second fluid flow rate if the hydraulic fluid volume difference is less than the first threshold value. The second fluid flow rate may be less than the first fluid flow rate.

In various embodiments, the first valve may output hydraulic fluid at a third fluid flow rate if the hydraulic fluid volume difference is less than a second threshold value. The second threshold value may be less than the first threshold value, and the third fluid flow rate may be less than the second fluid flow rate.

In various embodiments, the desired fluid flow rate may decrease as the hydraulic fluid volume difference decreases.

In various embodiments, the desired fluid flow rate may decrease as the pressurized gas volume difference decreases.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods disclosed herein may be useful for servicing landing gear shock struts. In accordance with various embodiments, the systems may be configured to electrically control the flow of fluid to the shock strut. In accordance with various embodiments, the system may determine the volume and/or flowrate of the fluid based on data output from sensors (e.g., pressure, temperature, and position sensors) operationally coupled to the shock strut. The systems and methods disclosed herein may provide a simple and precise means for any operator to service the shock strut. In this regard, the disclosed systems and methods may eliminate a need for manually controlling fluid pumps, thereby decreasing service time and/or increasing landing gear servicing efficiency.

Figure 1:
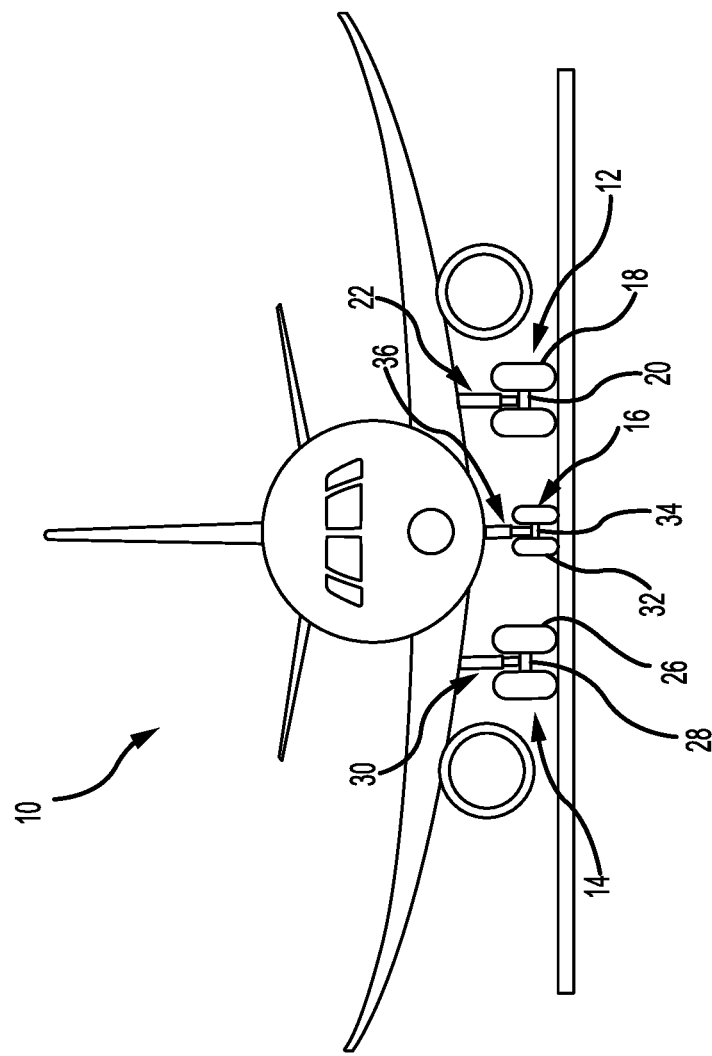
FIG. 1 illustrates an aircraft having landing gear in a landing gear down position, in accordance with various embodiments.

With reference to FIG. 1, an aircraft 10 is illustrated, in accordance with various embodiments. Aircraft 10 may include landing gear such as left (or first) landing gear 12, right (or second) landing gear 14, and nose (or third) landing gear 16. Left landing gear 12, right landing gear 14, and nose landing gear 16 may generally support aircraft 10 when aircraft 10 is not flying, allowing aircraft 10 to taxi, take off, and land without damage. Left landing gear 12 includes wheels 18, which may rotate about an axle 20. Left landing gear 12 includes a shock strut 22. Shock strut 22 may be coupled to axle 20 or to a landing gear bogie of left landing gear 12. Right landing gear 14 includes wheels 26, which may rotate about an axle 28. Right landing gear 14 includes a shock strut 30. Shock strut 30 may be coupled to axle 28 or to a landing gear bogie of right landing gear 14. Nose landing gear 16 may include wheels 32, which may rotate about an axle 34. The nose wheels 32 may differ from the main wheels 18, 26 in that the nose wheels may not include a brake. Nose landing gear 16 may include a shock strut 36. Shock strut 36 may be coupled to axle 34 or to a landing gear bogie of nose landing gear 16.

Aircraft 10 may include aircraft sensors 130 that detect aircraft status information. Aircraft status information may mean information relating to the status of aircraft 10, for example, the presence of weight on wheels, landing gear position, wheel position, air temperature, global positioning system coordinates, and/or the like.

Figure 2:
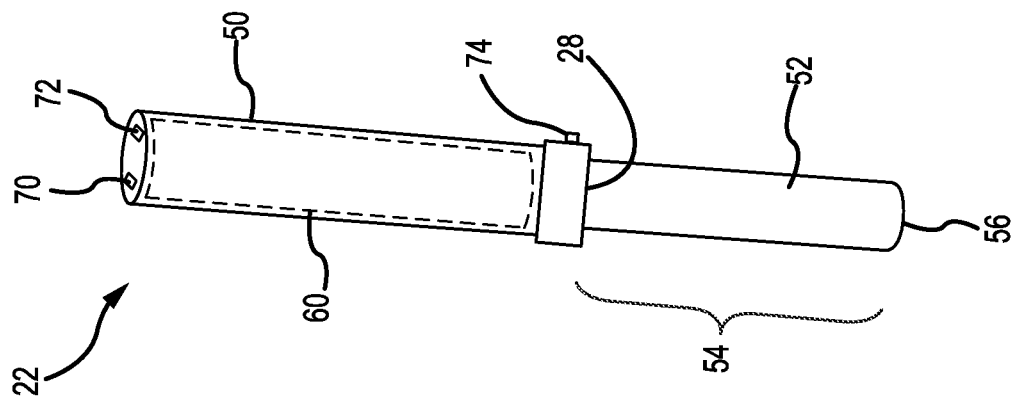
FIG. 2 illustrates a shock strut for a landing gear, in accordance with various embodiments.

With reference to FIG. 2, shock strut 22 of left landing gear 12 is illustrated. While FIG. 2 illustrates shock strut 22, it is contemplated and understood that shock strut 30 of right landing gear 14 and/or shock strut 36 of nose landing gear 16 may each include the features and functionalities as described herein with reference to shock strut 22.

Shock strut 22 may include a strut cylinder 50 and a strut piston 52. Strut piston 52 may be operatively coupled to strut cylinder 50. Strut cylinder 50 may be configured to receive strut piston 52 in a manner that allows the two components to telescope with respect to one another. Strut piston 52 may translate into and out strut cylinder 50, thereby absorbing and damping loads imposed on left landing gear 12. Strut piston 52 may extend from strut cylinder 50 by a stroke length 54. In various embodiments, stroke length 54 may correspond to a distance between an end 56 of strut piston 52 and an end 58 of strut cylinder 50. End 56 of strut piston 52 may be located proximate and/or coupled to axle 20 of left landing gear 12, with momentary reference to FIG. 1. End 58 of strut cylinder 50 is oriented toward axle 20 and may define the cylinder opening through which strut piston 52 translates. In various embodiments, fluid including hydraulic fluid (e.g., oil) and/or pressurized gas, such as nitrogen gas, may be located within an internal volume 60 of strut cylinder 50. The internal volume 60 may consist of a single cavity or separate cavities containing different isolated fluids within the cavities. Strut piston 52 is configured to translate relative to strut cylinder 50 in response to changes in the internal cavity pressure, for example, in response to the flow of fluid into and out internal volume 60 of strut cylinder 50.

In various embodiments, one or more pressure sensor(s) 70, one or more temperature sensor(s) 72, and/or one or more position sensor(s) 74 may be operatively coupled to and in operable communication with shock strut 22. Pressure sensor(s) 70 may be configured to measure the pressure in various locations along shock strut 22. For example, one or more pressure sensor(s) 70 may measure a pressure within internal volume 60. Temperature sensor(s) 72 may be configured to measure a temperature in various locations along shock strut 22. For example, one or more temperature sensor(s) 72 may measure a temperature within internal volume 60. Position sensor(s) 74 may be configured to measure stroke length 24 and/or may output data, which may be used to determine stroke length 24. Position sensor(s) 74 may be coupled to strut piston 52 and/or other components of landing gear 12. For example, position sensors 74 may be coupled landing gear linkages (e.g., struts) that pivot relative to one another in response to changes in stroke length 54, and the data output from position sensor(s) 74 may correlate to an angle formed by a pair of landing gear linkages that pivot relative to one another in response to changes in stroke length 54.

Figure 3A:
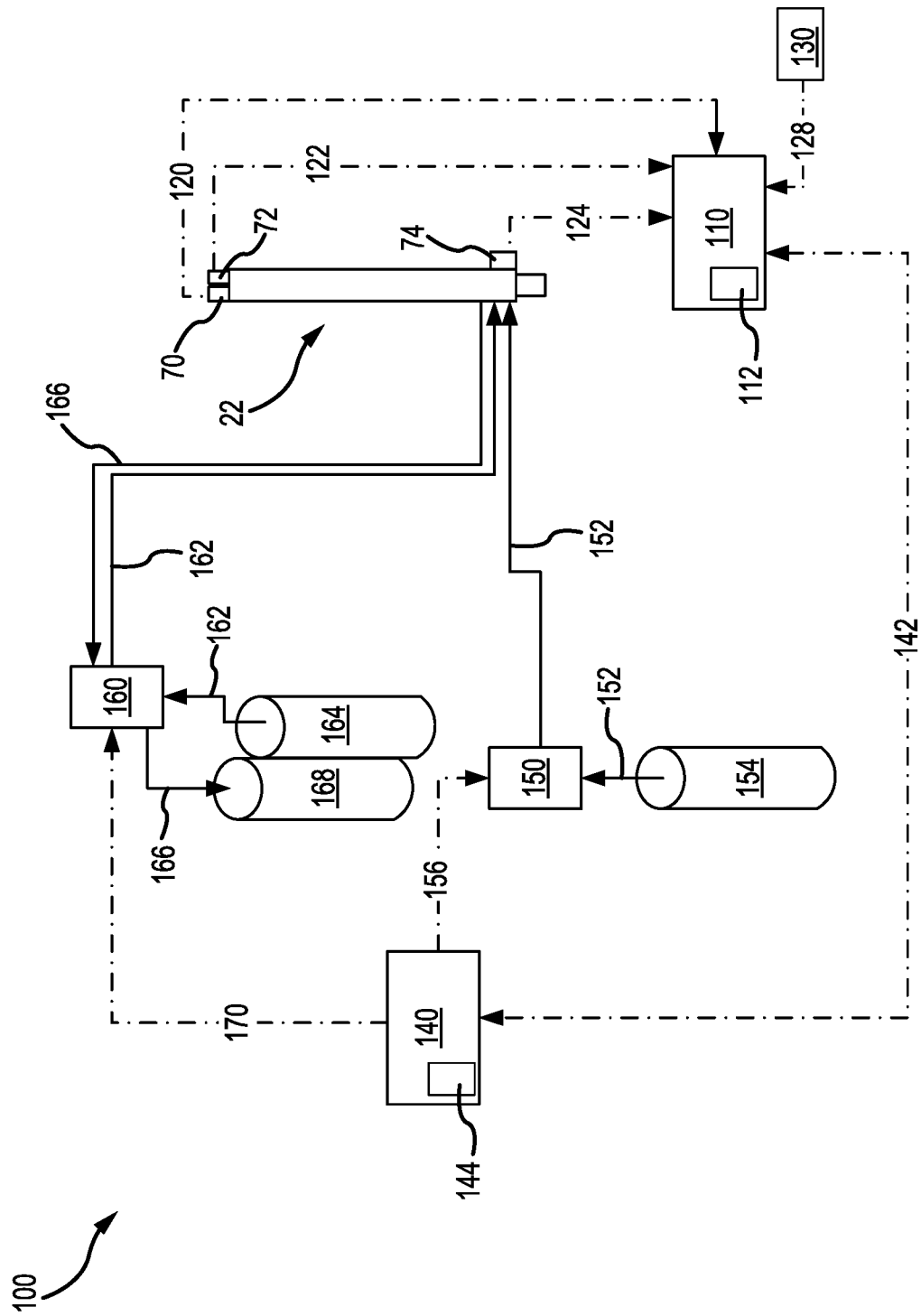
FIGS. 3A, 3B, and 3C illustrate a system for servicing a landing gear shock strut, in accordance with various embodiments.

With additional reference to FIG. 3A, a system 100 for servicing a shock strut is illustrated, in accordance with various embodiments. System 100 may be configured to control the flow of fluid drained from and injected into a shock strut, such as shock strut 22. System 100 may include a ground support controller 110. Ground support controller 110 may include one or more processors and may be capable of implementing logic. The processor(s) can be general purpose processor(s), digital signal processor(s) (DSPs), application specific integrated circuits (ASICs), field programmable gate arrays (FPGAs) or other programmable logic devices, discrete gates or transistor logics, discrete hardware components, or a combination thereof.

System program instructions and/or controller instructions may be loaded onto tangible, non-transitory, computer-readable medium 112 (also referred to herein as a tangible, non-transitory, memory 112) having instructions stored thereon that, in response to execution by ground support controller 110, cause the ground support controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Ground support controller 110 may receive pressure measurements 120 from pressure sensor(s) 70, temperature measurements 122 from temperature sensor(s) 72, and position measurements 124 from position sensor(s) 74. Ground support controller 110 may be in electrically coupled to, pressure sensors 70, temperature sensors 72, and pressure sensors 74 via wired connection, wireless connection, or any other form of connection capable of transferring data and/or signals between ground support controller 110 and pressure sensors 70, temperature sensors 72, and pressure sensors 74.

Ground support controller 110 may determine an actual hydraulic fluid volume of shock strut 22 (e.g., a current volume of the hydraulic fluid located within shock strut 22) and/or an actual pressurized gas volume of shock strut 22 (e.g., a current volume of the pressurized gas located within shock strut 22). Ground support controller 110 may determine the actual hydraulic fluid volume using pressure measurements 120, temperature measurements 122, and position measurements 124. Ground support controller 110 may determine the actual pressurized gas volume of shock strut 22 using pressure measurements 120, temperature measurements 122, and position measurements 124.

Ground support controller 110 may also receive data 128 from various aircraft sensors 130. Aircraft sensors 130 may comprise, for example, weight on wheels sensors, landing gear position sensors, or other sensors configured to convey information corresponding to shock strut 22 and/or left landing gear 12. Ground support controller 110 may be configured to determine a desired (or target) shock strut pressure and/or a desired (or target) stroke length using the temperature measurements 122, and data 128. Ground support controller 110 may determine a desired hydraulic fluid volume (or target hydraulic fluid volume) and/or a desired pressurized gas volume (e.g., a target pressurized gas volume) using on the desired shock strut pressure, the desired stroke length, and temperature measurements 122. Ground support controller 110 may compare the actual hydraulic fluid volume to the desired hydraulic fluid volume and determine a difference between the actual hydraulic fluid volume and the desired hydraulic fluid volume. Ground support controller 110 may compare the actual pressurized gas volume to the desired pressurized gas volume and determine a difference between the actual pressurized gas volume to the desired pressurized gas volume. In various embodiments, the differences may be expressed as a percentage of desired volume.

System 100 further includes a system controller 140. System controller 140 may be in communication with and operably coupled to ground support controller 110. In accordance with various embodiments, system controller 140 may receive signals 142 from the ground support controller 110. Signals 142 may be sent via wired or wireless connection. Signals 142 may correspond to the difference between the desired hydraulic fluid volume and the actual hydraulic fluid volume (referred to herein as the "hydraulic fluid volume difference") and/or to the difference between the desired pressurized gas volume and the actual pressurized gas volume (referred to herein as the "pressurized gas volume difference"). In various embodiments, signals 142 may corresponds to the desired pressurized gas volume, the actual pressurized gas volume, the actual hydraulic fluid volume and/or the desired hydraulic fluid volume calculated by ground support controller 110.

System controller 140 may include one or more processors and may be capable of implementing logic. The processor(s) can be general purpose processor(s), DSPs, ASICs, FPGAs or other programmable logic devices, discrete gates or transistor logics, discrete hardware components, or a combination thereof. System program instructions and/or controller instructions may be loaded onto tangible, non-transitory, computer-readable medium 144 (also referred to herein as a tangible, non-transitory, memory 144) having instructions stored thereon that, in response to execution by system controller 140, cause the system controller to perform various operations. In various embodiments, system controller 140 may be located on a portable electronic device, such as a laptop computer, a tablet, a cellular phone, or the like.

System controller 140 may be configured to determine a desired fluid flow rate (e.g., a fluid flow velocity) based on the signals 142 received from ground support controller 110. In various embodiments, system controller 140 may determine a desired fluid injection volume based on the signals 142 received from ground support controller 110. System controller 140 may be configured to determine the desired fluid flow rate based on the hydraulic fluid volume difference and/or the pressurized gas volume difference. For example, system controller 140 may decrease the fluid flow rate as the difference(s) decrease. Decreasing the fluid flow rate as the hydraulic fluid volume and the pressurized gas differences decrease allows for better control of the filling process, particularly, as the volume of fluid injected approaches the desired hydraulic fluid volume and the desired pressurized gas volume. Decreasing the fluid flow rate as the hydraulic fluid volume and the pressurized gas differences decrease allows tends increase a likelihood shock strut 12 will be filled to the desired hydraulic fluid volume and the desired pressurized gas volume, and may reduce occurrences of underfilling and overfilling.

System 100 further includes a pressurized gas flow controller 150. As described in further detail below with reference to FIG. 3B, pressurized gas flow controller 150 may control the flow of pressurized gas 152 from a gas source 154 to shock strut 22. Pressurized gas flow controller 150 may be in communication with and operably coupled to system controller 140. In accordance with various embodiments, pressurized gas flow controller 150 may receive desired fluid flow rate signals 156 from the system controller 140 (also referred to as gas flow rate signals 156). Desired fluid flow rate signals 156 may be sent via wired or wireless connection. Desired fluid flow rate signals 156 may correspond the desired pressurized gas fluid flow rate determined by system controller 140 based on the pressurized gas volume difference. Pressurized gas flow controller 150 may modulate the fluid flow rate of pressurized gas 152 based on desired fluid flow rate signals 156.

System 100 further includes a hydraulic fluid flow controller 160. As described in further detail below with reference to FIG. 3C, hydraulic fluid flow controller 160 may control the flow of hydraulic fluid 162 from a hydraulic fluid source 164 to shock strut 22. Hydraulic fluid flow controller 160 may also control the flow of hydraulic fluid 166 between shock strut 22 and a hydraulic fluid receptacle 168. Hydraulic fluid flow controller 160 may be in communication with and operably coupled to system controller 140. In accordance with various embodiments, hydraulic fluid flow controller 160 may receive desired fluid flow rate signals 170 from the system controller 140 (also referred to as desired hydraulic fluid flow rate signals). Desired fluid flow rate signals 170 may be sent via wired or wireless connection. Desired fluid flow rate signals 170 may correspond the desired hydraulic fluid flow rate determined by system controller 140 based on the hydraulic fluid volume difference. Hydraulic fluid flow controller 160 may modulate the fluid flow rate of hydraulic fluid 162 based on desired hydraulic flow rate signals 170 received from system controller 140.

Figure 3B:
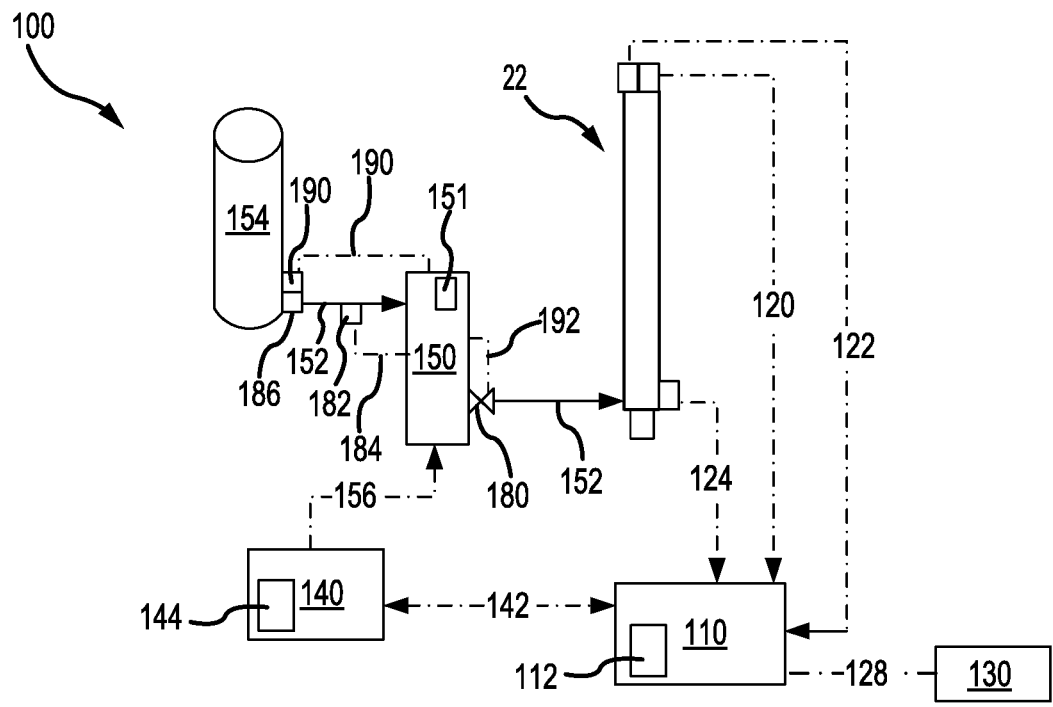

With reference to FIG. 3B, additional details of system 100 are illustrated, in accordance with various embodiments. Pressurized gas flow controller 150 is configured to regulate the flow of pressurized gas 152 from gas source 154 to shock strut 22. Pressurized gas flow controller 150 may include one or more processors and may be capable of implementing logic. The processor(s) can be general purpose processor(s), DSPs, ASICs, FPGAs or other programmable logic devices, discrete gates or transistor logics, discrete hardware components, or a combination thereof. System program instructions and/or controller instructions may be loaded onto tangible, non-transitory, computer-readable medium 151 having instructions stored thereon that, in response to execution by pressurized gas flow controller 150, cause the pressurized gas flow controller to perform various operations.

Pressurized gas flow controller 150 may be in communication with and may control one or more valves 180 and/or one or more pumps 182 fluidly coupled between gas source 154 and shock strut 22. In various embodiments, pump 182 may be configured to pump gas 152 from gas source 154. Pressurized gas flow controller 150 may send commands 184 to pump 182. Commands 184 may control the fluid flow rate at which pump 182 pumps gas 152. In various embodiments, commands 184 are configured to cause pump 182 to gas 152 at a fluid flow rate that is equal, or nearly equal, to the desired fluid flow rate signals 156 output by system controller 140.

In various embodiments, system 100 is configured to cause the fluid flow rate generated by pump 182 to decrease as the pressurized gas volume difference decreases. In various embodiments, system controller 140 may send desired fluid flow rate signals 156 corresponding to a first fluid flow rate, when the pressurized gas volume difference is greater than or equal to a first threshold value. Pressurized gas flow controller 150 then outputs a command 184, corresponding to the first fluid flow rate to pump 182. Pump 182 pumps gas 152 at the first fluid flow rate, in response to receiving command 184. For example, system controller 140 may send desired fluid flow rate signals 156 corresponding to the first fluid flow rate to pressurized gas flow controller 150 when the pressurized gas volume difference is greater than or equal to 50% (i.e., when the actual pressurized gas volume is 50% or less of the desired pressurized gas volume). In various embodiments, the first fluid flow rate may be between 50% and 100%, 75% and 100%, or 95% and 100% of a maximum fluid flow rate of pump 182. In this regard, commands 184 corresponding the first fluid flow rate are configured to cause pump 182 pump gas 152 at fluid flow rate of between 50% and 100%, 75% and 100%, or 95% and 100% of the maximum fluid flow rate pump 182 may generate.

In various embodiments, system controller 140 may send desired fluid flow rate signals 156 corresponding to a second fluid flow rate when the pressurized gas volume difference is greater than or equal to a second threshold value and less than the first threshold value. Pressurized gas flow controller 150 then outputs a command 184, corresponding to the second fluid flow rate to pump 182. Pump 182 pumps gas 152 at the second fluid flow rate, in response to receiving command 184. For example, system controller 140 may send desired fluid flow rate signals 156 corresponding to the second fluid flow rate to pressurized gas flow controller 150 when the pressurized gas volume difference is greater than or equal to 10% and less than 50% (i.e., when the actual pressurized gas volume is greater than 50% of the of the desired pressurized gas volume and less than or equal to 90% of the desired pressurized gas volume). In various embodiments, the second fluid flow rate may be between 15% and 50%, 25% and 50%, or 40% and 50% of the maximum fluid flow rate of pump 182. In this regard, commands 184 corresponding the second fluid flow rate are configured to cause pump 182 pump gas 152 at fluid flow rate of between 15% and 50%, 25% and 50%, or 40% and 50% of the maximum fluid flow rate pump 182 may generate.

In various embodiments, system controller 140 may send desired fluid flow rate signals 156 corresponding to a third fluid flow rate when the pressurized gas volume difference is less than the second threshold value. Pressurized gas flow controller 150 then outputs a command 184, corresponding to the third fluid flow rate to pump 182. Pump 182 pumps gas 152 at the third fluid flow rate, in response to receiving command 184. For example, system controller 140 may send desired fluid flow rate signals 156 corresponding to the third fluid flow rate to pressurized gas flow controller 150 when the pressurized gas volume difference is less than 10% (i.e., when the actual pressurized gas volume is greater than 90% of the of the desired pressurized gas volume). In various embodiments, the third fluid flow rate may be between 1% and 20%, 1% and 10%, or 1% and 5% of the maximum fluid flow rate of pump 182. In this regard, commands 184 corresponding third fluid flow rate are configured to cause pump 182 pump gas 152 at fluid flow rate of between 1% and 20%, 1% and 10%, or 1% and 5% of the maximum fluid flow rate pump 182 may generate.

In various embodiments, pump 182 may be eliminated as the pressure within gas source 154 may drive the flow of gas 152 output from gas source 154. In various embodiments, pressurized gas flow controller 150 may control actuation of a valve 186 of gas source 154. In various embodiments, pressurized gas flow controller 150 may send actuation command 188 to an actuator 190 configured to actuate valve 186 between an open position and a closed position.

In various embodiments, system 100 actuates valve(s) 180, instead of or in addition to modulating the fluid flow rate of pump 182, to decrease fluid flow rate of gas 152. In various embodiments, pressurized gas flow controller 150 sends actuation commands 192 configured to actuate one or more valve(s) 180. In various embodiments, one or more of valve(s) 180 may comprise a solenoid valve other valve, which may be actuated via an actuation commands 192. In various embodiments, actuation commands 192 may be sent to one or more valve actuators operably coupled and configured to translate valve(s) 180.

In various embodiments, system controller 140 may send desired fluid flow rate signals 156 corresponding to a first fluid flow rate, when the pressurized gas volume difference is greater than or equal to the first threshold value. Pressurized gas flow controller 150 then outputs actuation commands 192, configured to actuate valve(s) 180 to a position where the flow output from valves(s) is equal, or nearly equal to the first fluid flow rate. For example, system controller 140 may send desired fluid flow rate signals 156 corresponding to the first fluid flow rate, when the pressurized gas volume difference is greater than or equal to 50% (i.e., when the actual pressurized gas volume is 50% or less of the desired pressurized gas volume). In various embodiments, the first fluid flow rate may be between 50% and 100%, 75% and 100%, or 95% and 100% of a maximum fluid flow rate through and/or output by valve(s) 180. In various embodiments, valves(s) 180 may be in a fully open position when the first fluid flow rate is desired.

In various embodiments, system controller 140 may send desired fluid flow rate signals 156 corresponding to a second fluid flow rate, when the pressurized gas volume difference is greater than or equal to a second threshold value and less than the first threshold value. Pressurized gas flow controller 150 then outputs actuation commands 192, configured to actuate valve(s) 180 to a position where the flow output from valves(s) 180 is equal, or nearly equal, to the second fluid flow rate. For example, actuation commands 192 may cause one or more valves 180 to close or partially close to reduce the fluid flow rate output from valve(s) 180. In various embodiments, the second fluid flow rate may be between 15% and 50%, 25% and 50%, or 40% and 50% of the maximum fluid flow rate through and/or output by valve(s) 180. The maximum fluid flow rate is generated when valve(s) 180 are in a fully open position.

In various embodiments, system controller 140 may send desired fluid flow rate signals 156 corresponding to a third fluid flow rate, when the pressurized gas volume difference is less than the second threshold value. Pressurized gas flow controller 150 then outputs actuation commands 192, configured to actuate valve(s) 180 to a position where the flow output from valves(s) 180 is equal, or nearly equal to the third fluid flow rate. For example, actuation commands 192 may cause one or more valves 180 to close or partially close to reduce the fluid flow rate output from valve(s) 180. In various embodiments, the third fluid flow rate may be between 1% and 20%, 1% and 10%, or 1% and 5% of the maximum fluid flow rate through and/or output by valve(s) 180.

Figure 3C:
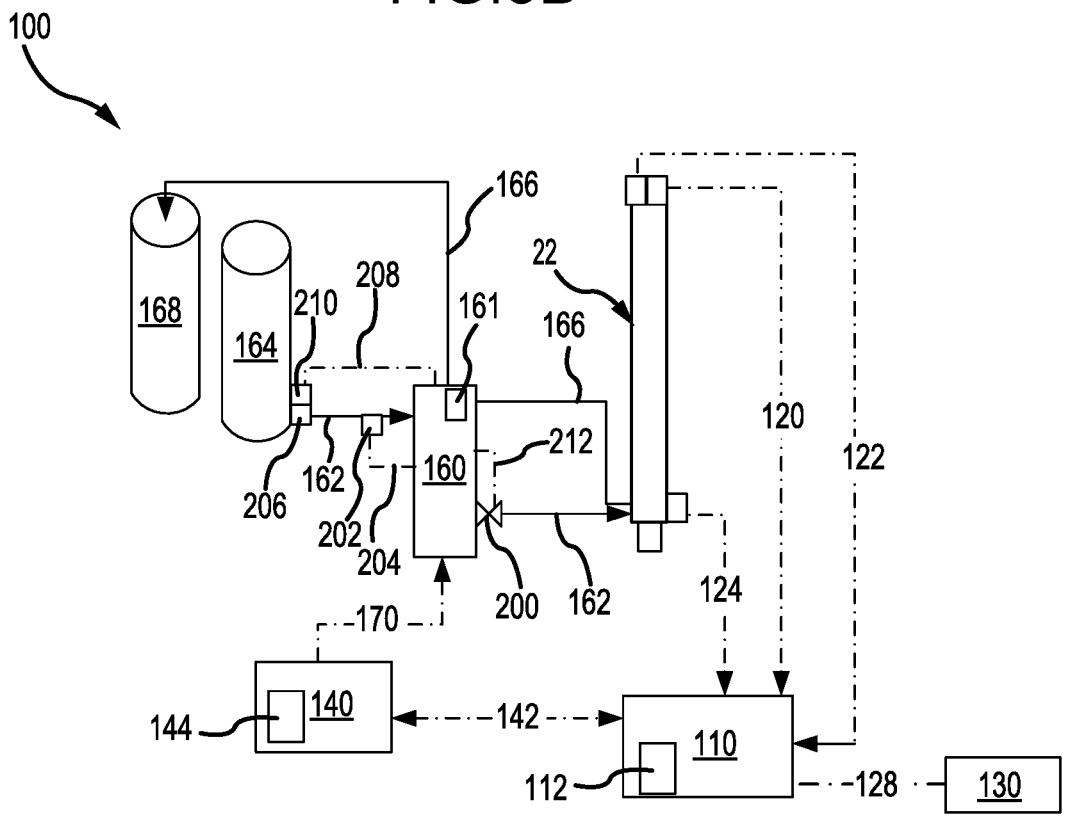

With reference to FIG. 3C, additional details of system 100 are illustrated, in accordance with various embodiments. Hydraulic fluid flow controller 160 is configured to regulate the flow of hydraulic fluid 162 from hydraulic fluid source 164 to shock strut 22. Hydraulic fluid flow controller 160 may include one or more processors and may be capable of implementing logic. The processor(s) can be general purpose processor(s), DSPs, ASICs, FPGAs or other programmable logic devices, discrete gates or transistor logics, discrete hardware components, or a combination thereof. System program instructions and/or controller instructions may be loaded onto tangible, non-transitory, computer-readable medium 161 (also referred to herein as a tangible, non-transitory, memory 161) having instructions stored thereon that, in response to execution by hydraulic fluid flow controller 160, cause the hydraulic fluid flow controller to perform various operations.

Hydraulic fluid flow controller 160 may be in communication with and may control one or more valves 200 and/or one or more pumps 202 fluidly coupled between hydraulic fluid source 164 and shock strut 22. In various embodiments, pump 202 may be configured to pump hydraulic fluid 162 from gas source 154. Hydraulic fluid flow controller 160 may send commands 204 to pump 202. Commands 204 may control the fluid flow rate at which pump 202 pumps hydraulic fluid 162. In various embodiments, commands 204 are configured to cause pump 202 to pump hydraulic fluid 162 at a fluid flow rate that is equal, or nearly equal, to the desired fluid flow rate signals 170 output by system controller 140.

In various embodiments, system 100 is configured to cause the fluid flow rate generated by pump 202 to decrease as the hydraulic fluid volume difference decreases. In various embodiments, system controller 140 may send desired fluid flow rate signals 170 corresponding to a first hydraulic fluid flow rate, when the hydraulic fluid volume difference is greater than or equal to a first hydraulic fluid threshold value. Hydraulic fluid flow controller 160 then outputs a command 204, corresponding to the first fluid flow rate to pump 202. Pump 202 pumps hydraulic fluid 162 at the first fluid flow rate, in response to receiving command 204. In various embodiments, the first fluid flow rate may be between 50% and 100%, 75% and 100%, or 95% and 100% of a maximum fluid flow rate of pump 202.

In various embodiments, system controller 140 may send a desired fluid flow rate signals 170 corresponding to a second hydraulic fluid flow rate, when the hydraulic fluid volume difference is greater than or equal to a second threshold value and less than the first threshold value. Hydraulic fluid flow controller 160 then outputs a command 204, corresponding to the second hydraulic fluid flow rate to pump 202. Pump 202 pumps hydraulic fluid 162 at the second fluid flow rate, in response to receiving command 204. In various embodiments, the second fluid flow rate may be between 15% and 50%, 25% and 50%, or 40% and 50% of the maximum fluid flow rate of pump 202.

In various embodiments, system controller 140 may send a desired fluid flow rate signals 170 corresponding to a third fluid flow rate, when the hydraulic fluid volume difference is less than the second hydraulic fluid threshold value. Hydraulic fluid flow controller 160 then outputs a command 204, corresponding to the third fluid flow rate to pump 202. Pump 202 pumps hydraulic fluid 162 at the third fluid flow rate, in response to receiving command 204. In various embodiments, the third fluid flow rate may be between 1% and 20%, 1% and 10%, or 1% and 5% of the maximum fluid flow rate of pump 202.

In various embodiments, pump 202 may be eliminated as the pressure within hydraulic fluid source 164 may drive the flow of hydraulic fluid 162 output from hydraulic fluid source 164. In various embodiments, hydraulic fluid flow controller 160 may control actuation of a valve 206 of hydraulic fluid source 164. In various embodiments, hydraulic fluid flow controller 160 may send actuation commands 208 to an actuator 210 configured to actuate valve 206 between an open position and a closed position.

In various embodiments, system 100 actuates valve(s) 200, instead of or in addition to modulating the fluid flow rate of pump 202, to decrease fluid flow rate of hydraulic fluid 162. In various embodiments, hydraulic fluid flow controller 160 sends actuation commands 212 configured to actuate one or more valve(s) 200. In various embodiments, one or more of valve(s) 200 may comprise a solenoid valve or other valve, which may be actuated via an actuation commands 212. In various embodiments, actuation commands 212 may be sent to one or more valve actuators operably coupled and configured to translate valve(s) 200.

In various embodiments, system controller 140 may send desired fluid flow rate signals 170 corresponding to a first fluid flow rate, when the hydraulic fluid volume difference is greater than or equal to the first threshold value. Hydraulic fluid flow controller 160 then outputs actuation command(s) 212, configured to actuate valve(s) 200 to a position where the flow output from valves(s) 200 is equal, or nearly equal to the first fluid flow rate. The first fluid flow rate may be between 50% and 100%, 75% and 100%, or 95% and 100% of a maximum fluid flow rate through and/or output by valve(s) 200. In various embodiments, valves(s) 200 may be in a fully open position, when the first hydraulic fluid flow rate is desired.

In various embodiments, system controller 140 may send desired fluid flow rate signals 170 corresponding to a second fluid flow rate when the hydraulic fluid volume difference is greater than or equal to a second threshold value and less than the first threshold value. Hydraulic fluid flow controller 160 then outputs actuation commands 212, configured to actuate valve(s) 200 to a position where the flow output from valves(s) 200 is equal, or nearly equal to the second fluid flow rate. For example, actuation commands 212 may cause one or more valve(s) 200 to close or partially close to reduce the fluid flow rate output from valve(s) 200. In various embodiments, the second fluid flow rate may be between 15% and 50%, 25% and 50%, or 40% and 50% of the maximum fluid flow rate through and/or output by valve(s) 200. The maximum fluid flow rate is generated when valve(s) 200 are in a fully open position.

In various embodiments, system controller 140 may send desired fluid flow rate signals 170 corresponding to a third fluid flow rate when the hydraulic fluid volume difference is less than the second threshold value. Hydraulic fluid flow controller 160 then outputs actuation commands 212, configured to actuate valve(s) 200 to a position where the flow output from valves(s) 200 is equal, or nearly equal to the third fluid flow rate. For example, actuation commands 212 may cause one or more valves 180 to close or partially close to reduce the fluid flow rate output from valve(s) 200. In various embodiments, the third fluid flow rate may be between 1% and 20%, 1% and 10%, or 1% and 5% of the maximum fluid flow rate through and/or output by valve(s) 200.

Figure 4:
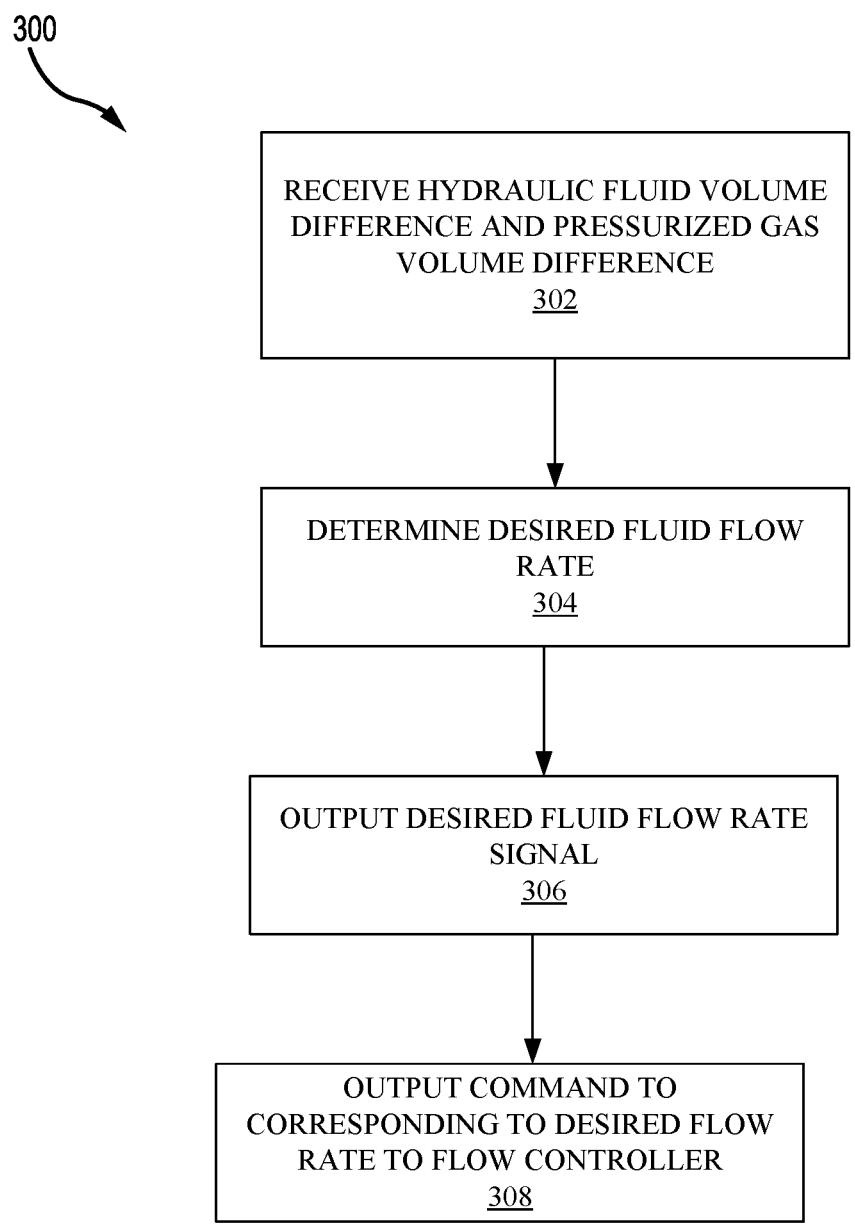
FIG. 4. illustrates a method for servicing a landing gear shock strut, in accordance with various embodiments.

With reference to FIG. 4, a method 300 for servicing a shock strut is illustrated, in accordance with various embodiments. With combined reference to FIGS. 4, 3B and 3C, method 300 may comprise receiving, by a system controller, at least one of a hydraulic fluid volume difference or a pressurized gas volume difference from a ground support controller (step 302). Step 302 may comprise system controller 140 receiving signals 142 corresponds hydraulic fluid volume difference and/or pressurized gas volume difference from ground support controller 110. Method 300 may comprise determining, by the system controller, a desired fluid flow rate based on the at least one of the hydraulic fluid volume difference or the pressurized gas volume difference (step 304). Step 304 may comprise system controller determining a desired fluid flow rate based on signals 142 received from ground support controller 110. Method 300 may further comprise outputting, by the system controller, a desired fluid flow rate signal corresponding to the desired fluid flow rate to at least one of a hydraulic fluid flow controller or a pressurized gas flow controller (step 306). Step 306 may include system controller 140 outputting desired fluid flow rate signal 156 to pressurized gas flow controller 150 and/or outputting desired fluid flow rate signal 170 to hydraulic fluid flow controller 160. In various embodiments, method 300 may further include outputting, by the hydraulic fluid flow controller and/or the pressurized gas flow controller, a command corresponding the desired fluid flow rate to a fluid flow rate controller (step 308). In various embodiments, the fluid flow rate controller may comprise a pump (e.g., pump 182 or pump 202) configured to control a flow of pressurized gas 152 or hydraulic fluid 162 to the shock strut. The command may be configured to cause the pump to pump the flow of pressurized gas 152 or of hydraulic fluid 162 at a fluid flow rate equal to the desired fluid flow rate. In various embodiments, step 308 may include hydraulic fluid flow controller 160 sending command 194 to pump 192 and/or pressurized gas flow controller 150 sending command 184 to pump 182.

In various embodiments, the fluid flow rate controller may comprise a valve (e.g., valve(s) 180 or valve(s) 200) configured to control a flow of pressurized gas 152 or hydraulic fluid 162 to the shock strut. The command may be configured to cause a flow of hydraulic fluid 162 or pressurized gas 152 output from the valve to flow at a fluid flow rate equal to the desired fluid flow rate. In various embodiments, step 308 may include hydraulic fluid flow controller 160 sending command 212 to valve(s) 200 and/or pressurized gas flow controller 150 sending command 192 to valve(s) 180.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for servicing a shock strut, comprising:
a system controller; and
a first tangible, non-transitory memory configured to communicate with the system controller, the first tangible, non-transitory memory having instructions stored thereon that, in response to execution by the system controller, cause the system controller to perform operations comprising:
receiving, by the system controller, at least one of a hydraulic fluid volume difference or a pressurized gas volume difference from a ground support controller;
determining, by the system controller, a desired fluid flow rate based on the at least one of the hydraulic fluid volume difference or the pressurized gas volume difference; and
outputting, by the system controller, a desired fluid flow rate signal corresponding to the desired fluid flow rate to at least one of a hydraulic fluid flow controller or a pressurized gas flow controller.

2. The system of claim 1, further comprising:
the hydraulic fluid flow controller; and
a second tangible, non-transitory memory configured to communicate with the hydraulic fluid flow controller, the second tangible, non-transitory memory having instructions stored thereon that, in response to execution by the hydraulic fluid flow controller, cause the hydraulic fluid flow controller to perform operations comprising:
receiving, by the hydraulic fluid flow controller, the desired fluid flow rate signal; and
outputting, by the hydraulic fluid flow controller, a command to a pump, wherein the command is configured to cause the pump to pump a flow of hydraulic fluid at a fluid flow rate equal to the desired fluid flow rate.

3. The system of claim 1, further comprising:
the hydraulic fluid flow controller; and
a second tangible, non-transitory memory configured to communicate with the hydraulic fluid flow controller, the second tangible, non-transitory memory having instructions stored thereon that, in response to execution by the hydraulic fluid flow controller, cause the hydraulic fluid flow controller to perform operations comprising:
receiving, by the hydraulic fluid flow controller, the desired fluid flow rate signal; and
outputting, by the hydraulic fluid flow controller, a command to a valve, wherein the command is configured to cause the valve to actuate to a position configured to output a flow of hydraulic at a fluid flow rate equal to the desired fluid flow rate.

4. The system of claim 1, further comprising:
the pressurized gas flow controller; and
a second tangible, non-transitory memory configured to communicate with the pressurized gas flow controller, the second tangible, non-transitory memory having instructions stored thereon that, in response to execution by the pressurized gas flow controller, cause the hydraulic fluid flow controller to perform operations comprising:
receiving, by the pressurized gas flow controller, the desired fluid flow rate signal; and
outputting, by the pressurized gas flow controller, a command to a pump, wherein the command is configured to cause the pump to pump a flow of pressurized gas at a fluid flow rate equal to the desired fluid flow rate.

5. The system of claim 1, further comprising:
the pressurized gas flow controller; and
a second tangible, non-transitory memory configured to communicate with the pressurized gas flow controller, the second tangible, non-transitory memory having instructions stored thereon that, in response to execution by the pressurized gas flow controller, cause the hydraulic fluid flow controller to perform operations comprising:
receiving, by the pressurized gas flow controller, the desired fluid flow rate signal; and
outputting, by the pressurized gas flow controller, a command to a valve, the valve being configured to control a flow of pressurized gas, wherein the command is configured to cause the valve to actuate to a position configured to output the flow of pressurized gas at a fluid flow rate equal to the desired fluid flow rate.

6. The system of claim 1, wherein determining, by the system controller, the desired fluid flow rate based on the at least one of the hydraulic fluid volume difference or the pressurized gas volume difference comprises:
 determining, by the system controller, if the at least one of the hydraulic fluid volume difference or the pressurized gas volume difference is greater than or equal to a first threshold value.

7. The system of claim 6, wherein determining, by the system controller, the desired fluid flow rate based on the at least one of the hydraulic fluid volume difference or the pressurized gas volume difference further comprises:
 determining, by the system controller, if the at least one of the hydraulic fluid volume difference or the pressurized gas volume difference is greater than or equal to a second threshold value; and
 determining, by the system controller, to output at least one of a first fluid flow rate, a second fluid flow rate, or a third fluid flow rate as the desired fluid flow rate signal, wherein the system controller outputs the first fluid flow rate as the desired fluid flow rate signal if the at least one of the hydraulic fluid volume difference or the pressurized gas volume difference is greater than or equal to the first threshold value, and wherein the system controller outputs the second fluid flow rate as the desired fluid flow rate signal if the at least one of the hydraulic fluid volume difference or the pressurized gas volume difference is greater than or equal to the second threshold value and less than the first threshold value, and wherein the system controller outputs the third fluid flow rate as the desired fluid flow rate signal if the at least one of the hydraulic fluid volume difference or the pressurized gas volume difference is less than the second threshold value.

8. A method for servicing a shock strut, comprising:
 receiving, by a system controller, at least one of a hydraulic fluid volume difference or a pressurized gas volume difference from a ground support controller;
 determining, by the system controller, a desired fluid flow rate based on the at least one of the hydraulic fluid volume difference or the pressurized gas volume difference; and
 outputting, by the system controller, a desired fluid flow rate signal corresponding to the desired fluid flow rate to at least one of a hydraulic fluid flow controller or a pressurized gas flow controller.

9. The method of claim 8, further comprising:
 receiving, by the at least one of the hydraulic fluid flow controller or the pressurized gas flow controller, the desired fluid flow rate signal; and
 outputting, by the at least one of the hydraulic fluid flow controller or the pressurized gas flow controller, a command to a pump, the pump being configured to control a flow of at least one of a pressurized gas or a hydraulic fluid, wherein the command is configured to cause the pump to pump the flow of the at least one of the pressurized gas or the hydraulic fluid at a fluid flow rate equal to the desired fluid flow rate.

10. The method of claim 8, further comprising:
 receiving, by the at least one of the hydraulic fluid flow controller or the pressurized gas flow controller, the desired fluid flow rate signal; and
 outputting, by the at least one of the hydraulic fluid flow controller or the pressurized gas flow controller, a command to a valve, the valve being configured to control a flow of at least one of a pressurized gas or a hydraulic fluid, wherein the command is configured to cause the valve to actuate to a position configured to output the flow of the at least one of the pressurized gas or the hydraulic fluid at a fluid flow rate equal to the desired fluid flow rate.

11. The method of claim 8, further comprising:
 determining, by the ground support controller, at least one of a desired hydraulic fluid volume or a desired pressurized gas volume;
 determining, by the ground support controller, at least one of an actual hydraulic fluid volume or an actual pressurized gas volume; and
 determining, by the ground support controller, the at least one of the hydraulic fluid volume difference or the pressurized gas volume difference by comparing the at least one of the desired hydraulic fluid volume or the desired pressurized gas volume to the least one of the actual hydraulic fluid volume or the actual pressurized gas volume.

12. The method of claim 11, wherein determining, by the system controller, the desired fluid flow rate based on the at least one of the hydraulic fluid volume difference or the pressurized gas volume difference comprises:
 determining, by the system controller, if the at least one of the hydraulic fluid volume difference or the pressurized gas volume difference is greater than or equal to a first threshold value.

13. The method of claim 12, wherein determining, by the system controller, the desired fluid flow rate based on the at least one of the hydraulic fluid volume difference or the pressurized gas volume difference further comprises:
 determining, by the system controller, if the at least one of the hydraulic fluid volume difference or the pressurized gas volume difference is greater than or equal to a second threshold value; and
 determining, by the system controller, to output at least one of a first fluid flow rate, a second fluid flow rate, or a third fluid flow rate as the desired fluid flow rate signal, wherein the system controller outputs the first fluid flow rate as the desired fluid flow rate signal if the at least one of the hydraulic fluid volume difference or the pressurized gas volume difference is greater than or equal to the first threshold value, and wherein the system controller outputs the second fluid flow rate as the desired fluid flow rate signal if the at least one of the hydraulic fluid volume difference or the pressurized gas volume difference is greater than or equal to the second threshold value and less than the first threshold value, and wherein the system controller outputs the third fluid flow rate as the desired fluid flow rate signal if the at least one of the hydraulic fluid volume difference or the pressurized gas volume difference is less than the second threshold value.

14. The method of claim 13, further comprising:
 outputting, by the at least one of the hydraulic fluid flow controller or the pressurized gas flow controller, a command to at least one of a valve or a pump in response to receiving the desired fluid flow rate signal, the command being configured to cause a flow of at least one of a hydraulic fluid or a pressurized gas output from the at least one the valve or the pump to flow at a fluid flow rate equal to the at least one of the first fluid flow rate, the second fluid flow rate, or the third fluid flow rate.

* * * * *